United States Patent [19]

Kornylak

[11] Patent Number: 4,981,203
[45] Date of Patent: Jan. 1, 1991

[54] MULTI DIRECTIONAL CONVEYOR WHEEL
[75] Inventor: Andrew T. Kornylak, Hamilton, Ohio
[73] Assignee: Kornylak Corporation, Hamilton, Ohio
[21] Appl. No.: 305,635
[22] Filed: Feb. 3, 1989
[51] Int. Cl.$^5$ .............................................. B65G 13/00
[52] U.S. Cl. ................... 193/35 MD; 193/37; 198/782
[58] Field of Search ............... 198/786, 787, 782, 372; 193/35 MD, 37

[56] References Cited

U.S. PATENT DOCUMENTS

| 3,363,735 | 1/1968 | Hotchkiss | 193/37 |
|---|---|---|---|
| 3,435,938 | 4/1969 | Warren et al. | 193/37 |
| 3,552,541 | 1/1971 | Riggs | 198/786 X |
| 3,590,970 | 7/1971 | Kornylak | 193/35 MP X |
| 3,621,961 | 11/1971 | Stumpf | 193/37 |
| 3,645,379 | 2/1972 | Kornylak . | |
| 3,874,491 | 4/1975 | Faure | 193/35 MD |
| 3,878,927 | 4/1975 | Murakami | 193/37 |
| 3,961,694 | 6/1976 | Murakami | 1983/37 |
| 3,964,588 | 6/1976 | Kornylak | 193/37 X |
| 4,279,559 | 7/1981 | Stumpf | 198/37 X |

FOREIGN PATENT DOCUMENTS

| 1061694 | 7/1959 | Fed. Rep. of Germany | 193/35 MD |
|---|---|---|---|
| 2627014 | 12/1977 | Fed. Rep. of Germany | 193/35 MD |
| 1552928 | 1/1969 | France | 193/35 MD |
| 0264111 | 11/1987 | Japan | 193/35 MD |
| 0284220 | 1/1971 | U.S.S.R. | 198/786 |
| 0591369 | 2/1978 | U.S.S.R. | 198/786 |

OTHER PUBLICATIONS

"Roll-Flex All-Side Manipulation Systems", (brochure undated).

Primary Examiner—H. Grant Skaggs
Assistant Examiner—D. Glenn Dayoan
Attorney, Agent, or Firm—Fay, Sharpe, Beall, Fagan, Minnich & McKee

[57] ABSTRACT

A multi directional wheel, particularly for use with guide structures and conveying structures, driven or undriven, consists of only two different parts, namely an integral one piece molded synthetic resin hub and an integral one piece molded synthetic resin roller. A plurality of such rollers are mounted about the periphery of the hub so that the axes of the rollers are parallel to each other and perpendicular to the axis of the hub, with bearings being provided by the inherent structure of the hub and rollers. Bearing supports extend outwardly from the hub and engage between subrollers that make up the rollers, so that the rollers may be closely spaced to each other without any intervening structure, to lessen flat spots between adjacent rollers. Rollers are snap fit into the bearing supports in the axial direction, so that two wheels may be mounted together as mirror images to prevent withdrawal of the rollers on the snap fit assembly. In such an assembly, the rollers, bearing barrel shape, may be angularly offset as between adjacent wheels and overlap a central plane of symmetry. A plurality of teeth are mounted between annular flanges of the hub to reinforce the hub immediately opposite each roller and to provide for toothed driving of the hub.

34 Claims, 3 Drawing Sheets 4,981,203

MULTI DIRECTIONAL CONVEYOR WHEEL

BACKGROUND OF THE INVENTION

The present invention relates to a multi directional conveyor wheel, particularly of the type shown in applicant's U.S. Pat. Nos. 3,590,970; 3,964,588; and 3,645,379. This type of multi directional wheel may be driven about one axis, or be completely undriven. Such wheels may be mounted on rails, as set forth in the above patents, or on rails such as shown in the applicant's prior U.S. Pat. Nos. 3,881,789 and 4,006,810, for conveying.

SUMMARY OF THE INVENTION

The cross or multi directional wheel of the present invention may be driven or undriven, it may be used alone or in combination with other identical or similar wheels, it may be used to merely guide an object in a conveying system wherein the wheel surface engages the side of a conveyed article or it may be used as an article support. Two or more wheels may be joined together in an assembly by rigidly bonding together their hubs to provide a greater guiding or supporting surface.

Each wheel consists of only two parts, preferably, which are a hub and a roller, with a plurality of the rollers mounted around the periphery of the hub with the axis of the roller perpendicular to the axis of the hub. Each roller is provided with at least three subrollers axially spaced from each other and connected together by a shaft so that bearing supports extending outwardly from the hub may extend between adjacent pairs of subrollers to rotatably support the shafts. In this manner, the subrollers may be placed very close together in substantially contacting relationship or as closely spaced as desired without any intermediate nonrotating structure between them. In this manner, the plural rollers around the periphery of the hub are more closely spaced than the above-mentioned prior art rollers. Also, fewer parts are needed to construct such a multi directional wheel.

The rollers are snap assembled on the bearing supports, with the bearing supports being provided with a keyhole type of structure for snap assembly. The snap assembly structure of the bearing support opens parallel to the axis of the hub, so that two wheels may be placed as mirror images together with their hubs bonded so that the snap assembly apertures open generally axially toward each other and the adjacent rollers of the two wheels being sufficiently close that it is then impossible to disassemble the rollers from the bearing supports.

The hub is provided with an internal ring gear that provides for reinforcement of the hub, consistent wall thickness in the molded part, and ring gear teeth for driving the hub in a driven wheel conveyor. A flange extends outwardly on only one side of the hub for reinforcing the support members and reinforcing the hub in general. Preferably, the rollers are above this flange and axially overlap the flange so that the flange does not materially increase the axial dimension of the wheel. Preferably, the flange is only provided on the outside of one end of the wheel, so that the opposite side of the wheel may be connected to a like side of another wheel in the assembly of wheels.

Each of the wheels may be somewhat barrel shaped, that is with arcuate upper and lower surfaces when viewed perpendicular to the roller shaft so that all of the arcs of the rollers are coextensive with a reference circle providing the support periphery of the wheel. The rollers are equally angularly spaced around the periphery of the hub. When two wheels are joined together to form an assembly, the rollers of one wheel are spaced between the rollers of the adjacent wheel. Due to the somewhat barrel shape of the rollers, the rollers of one wheel will actually extend axially between adjacent rollers of the next wheel, that is a plane perpendicular to the axis of the hub and touching the innermost portion of all of the rollers of one wheel will be intersected by the innermost portions of the rollers of the adjacent wheel of the assembly.

BRIEF DESCRIPTION OF THE DRAWINGS

Further objects, features and advantages of the present invention will become more clear from the following detailed description of a preferred embodiment, wherein.

DETAILED DESCRIPTION OF THE INVENTION

As a significant part of the present invention, the inventor has analyzed conventional multi directional conveyor wheels. This analysis has been performed using the structures of FIGS. 1 and 8. A more detailed description of this analysis will be set forth below after first describing the structure of a preferred embodiment of the present invention so that a comparison between the two may be made.

The structure of a single wheel according to the preferred embodiment of the present invention is set forth in FIGS. 2-5. This wheel preferably consists of only two different parts. The first part is a single one piece molded synthetic resin hub. The second part is a single one piece molded synthetic resin roller. A plurality of such rollers are mounted around the periphery of the hub using bearing structure that is only a part of either the hub or the rollers. The synthetic resin is preferably a self lubricating type.

Figure 2:
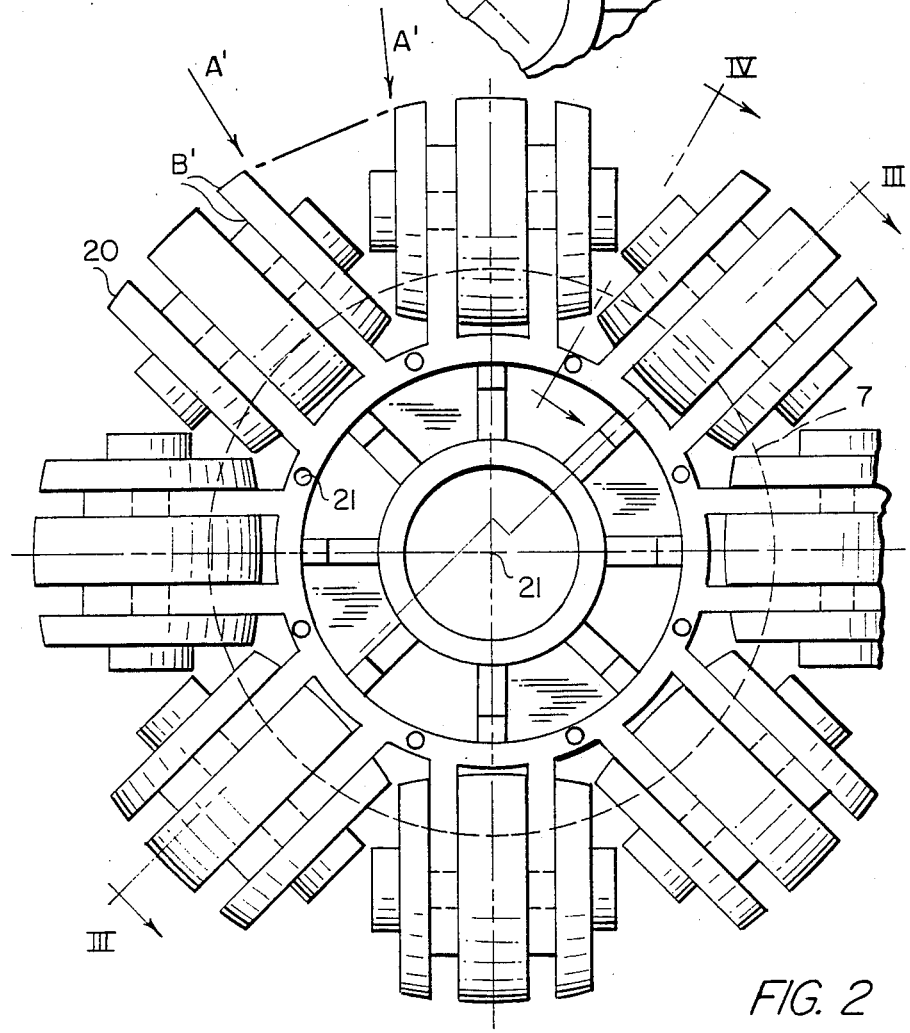
FIG. 2 is an end elevational view of a multi directional wheel constructed according to the present invention.
Figure 3:
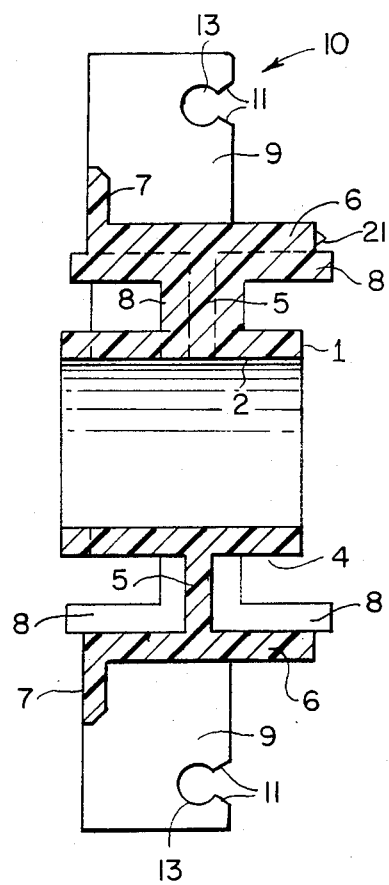
FIG. 3 is a cross sectional view taken along line III—III in FIG. 2, with the rollers removed.
Figure 6:
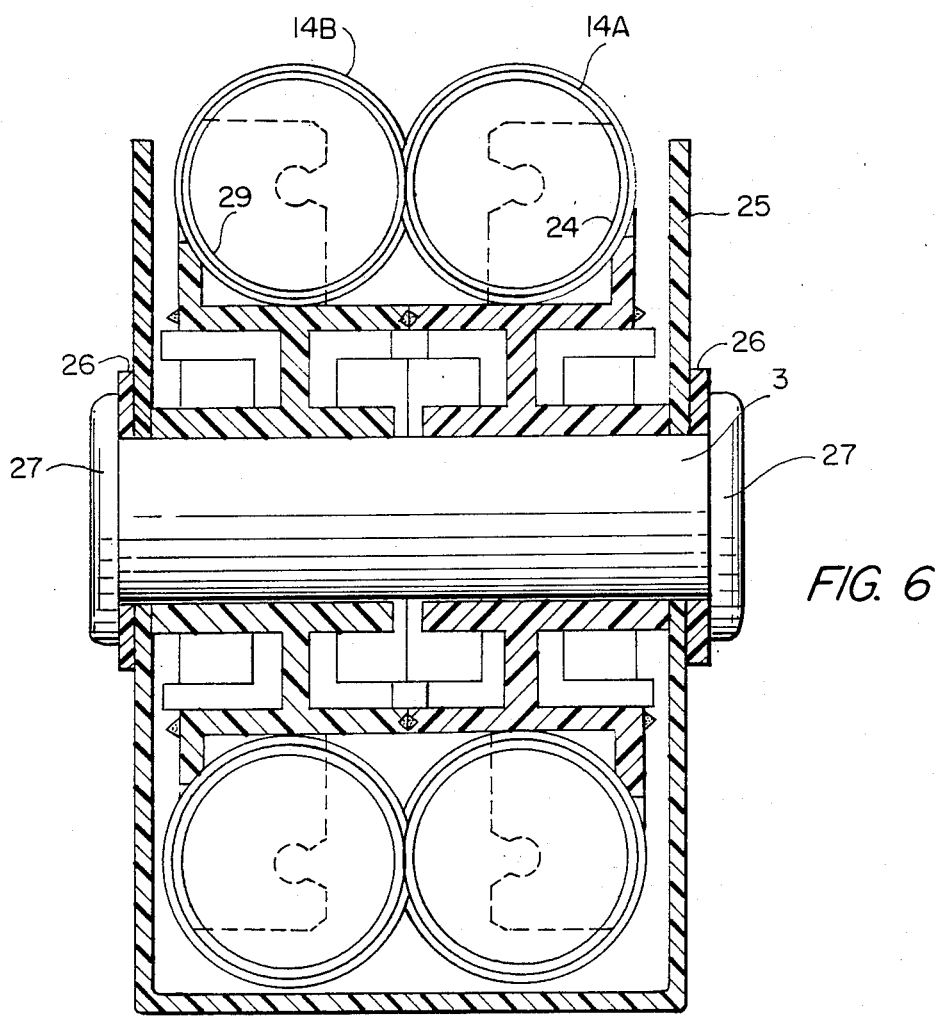
FIG. 6 shows an assembly of wheels mounted on a conveyor rail.

The hub shown in FIGS. 2 and 3 comprises a central bearing sleeve 1 having a cylindrical inner surface 2 that can function as a sleeve bearing for a shaft, for example the shaft 3 shown in FIG. 6. The outer surface 4 of sleeve 1 is cylindrical. Extending radially outward from the outer surface 4, there is an annular flange 5 around the entire outermost periphery, the flange 5 joining with cylindrical flange 6. At only one axial end of the cylindrical flange 6, there is provided an annular radially outwardly extending flange 7. The flange 5 is somewhat offset from the center of the sleeve 1, toward what will become the inside of the hub when it is assembled as shown in FIG. 6. A plurality of integral L-shaped teeth extend around the periphery on each axial side of the flange 5, with the short legs of the teeth being integral with the flange 5 and the long leg of the teeth 8 being integral with the flange 6. The teeth on the inside extend axially beyond the periphery of the bearing sleeve 2 and the teeth on the outside are inwardly spaced from the outer periphery of the bearing sleeve 2. These teeth form a ring gear that may be used for driving the wheel, from either side. As mentioned, the wheel may be either driven or undriven. There are also a plurality of outwardly extending bearing supports 9 having their inner end integral with the flange 6 and one axial end partially integral with the flange 7. Each bearing support 9 includes a keyhole shaped snap fit bearing 10 defined by two opposed cam surfaces 11 starting with a spacing between them that is greater than the diameter of the roller shafts 12 shown in FIG. 5 and proceeding towards the center of the bearing support to a spacing less than the diameter of the shafts 12 where they join a partially cylindrical bearing 13 that is substantially of the same diameter as the shaft 12. The bearing 13 extends for an angular distance of greater than 180 degrees and preferably about 270 degrees to thoroughly trap the shaft 12 therein. In this manner, the shaft 12 can be assembled from the right hand side of FIG. 3 and moved axially against the cam surfaces 11 to spread the cam surfaces 11 apart due to the inherent resiliency of the shaft 12 and bearing support 9 until the shaft snaps into place within the bearing 13, to provide a snap fit. This type of snap fit is known per se in other environments.

Figure 5:
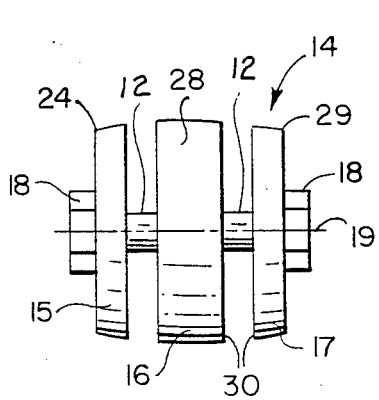
FIG. 5 is a side elevational view of a single roller taken from line V—V of FIG. 4.
Figure 4:
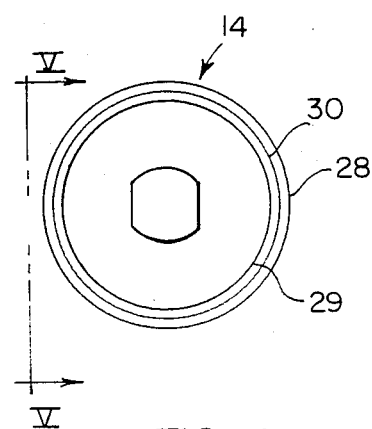
FIG. 4 is an axial end view of a single roller taken along line IV—IV in FIG. 2, with the hub removed.

As shown in FIGS. 4 and 5, each of the rollers 14 comprises three subrollers 15, 16, 17 integrally joined together by two shafts 12 between adjacent pairs. The subrollers 15, 16, 17 are axially spaced from each other. Reinforcing portions 18, which may be generally of any shape, effectively form extensions of the shaft 12 that are of a greater diameter or radial extent than shaft 12 to reinforce the subrollers 15 and 17. Preferably, the subrollers 15 and 17 have an axial length substantially less than and preferably one half that of the subroller 16. Subrollers 15 and 16 are spaced apart a distance corresponding to the spacing between subrollers 16 and 17, which distance, axially, corresponds generally to the thickness of the bearing support 9, as seen in FIG. 2.

As seen in FIG. 5, the roller is generally barrel shaped, that is, the subrollers 15, 16, 17, taken together, generally provide a surface of rotation formed by rotating an arc about the axis of rotation 19 of the roller that extends centrally through the shafts 12. This arc is a portion of a single circle that is coincident with the arcs of all of the rollers of the wheel as shown in FIG. 2 and at a radius 20 from the center 21 of the wheel that corresponds with the wheel axis of rotation, which is also the axis of rotation for the hub.

As seen in FIGS. 3 and 6, the flange 7 has a champfered outer edge to accommodate the adjacent wheel as seen in FIG. 6.

The teeth 8, in addition to providing a drive means for the driven wheel, reinforce the outer flange 6, as mentioned. Preferably, each of the teeth 8 is radial in extent and bisects the spacing between adjacent bearing supports 9 for each roller as seen in FIG. 2 so that the reinforcing function of each tooth is maximized for the roller support. As seen in FIG. 2, the rollers are spaced at even angles about the periphery of the hub.

As shown in FIG. 6, two hubs may be coaxially arranged in mirror image relationship so that their flanges 7 are to the outside. During assembly, the two hubs are placed coaxially together at an angular offset with respect to each other, with the angular offset equal to one half the angular distance between adjacent teeth 8, which is one half the angular distance between adjacent rollers 14. In this manner, the teeth 8 of one hub will telescope along the interior surface of the flange 6 of the adjacent hub without interference with the teeth 8 of the adjacent hub to thus assure coaxial relationship of the two hubs. Cement or solvent may be applied to the annular surface of the adjacent ends of the flanges 6 that contact each other to bond the two hubs together. The points or extensions 21 on this annular surface of the flange 6 and the corresponding opposite annular surface of the flange 6 are excess molding material at the injection points of the mold, which will embed themselves in the adjacent smooth portion of the adjacent flange 6 to interlock the two hubs, during assembly. Prior to this assembly of two hubs, all of the rollers of the two hubs are assembled. It is seen from FIG. 6, that the rollers of the adjacent hub will prevent disassembly of any roller once the hubs are assembled.

When used as a guide or conveyor, a plurality of the assemblies may be connected to a conveyor rail as shown in FIG. 6, according to the known usage and structure of the abovementioned U.S. Pat. Nos. 4,006,810 and 3,881,789, whose conveyor rail assembly structure and discussion is incorporated herein by reference. With respect to the present assembly shown in FIG. 6, a generally U-shaped sheet metal conveyor rail 25 of indefinite length is provided with a plurality of aligned pairs of holes respectively through its upstanding legs. A shaft 3 is passed through each pair of aligned holes or apertures in the rail 25. If desired, washers 26 and rivet ends 27 of the shaft 3 may complete the assembly. Of course, a standard threaded bolt and nut may be used instead of the shaft 3. In this manner, the wheel assembly is mounted for rotation on the shaft 3. Alternatively, the wheel assembly is press fit on the shaft 3 for rotation therewith, and the shaft 3 mounted for rotation within the aligned holes of the rail 25. In any event, the wheel assembly, as shown in FIG. 6, rotates about the axis of shaft 3.

It is also understood that the wheel assembly of FIG. 6 could be mounted by a cantilevered shaft 3, which would facilitate drive means engaging the teeth 8 for driving the wheel assembly.

Figure 7:
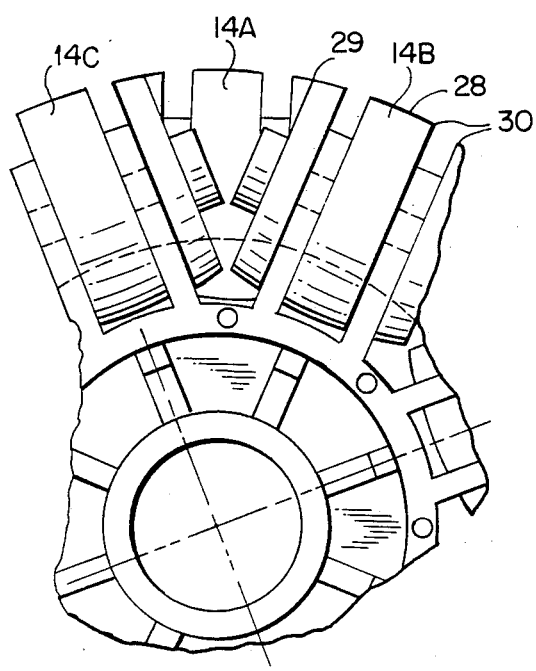
FIG. 7 is a partial view of FIG. 2 showing the addition of a second wheel according to the assembly of FIG. 6.

FIG. 2 is an end elevational view of only a single hub with rollers mounted thereon, while FIG. 7 is a partial end elevation view, corrresponding to FIG. 2, but showing the wheel assembly of FIG. 6. With reference to FIGS. 6 and 7, it is seen that roller 14a effectively overlaps rollers 14b and 14c. That is, the arc of roller 14a overlaps the arcs of 14c and 14b rollers as viewed in FIG. 7, to provide effective gaps in the annular support surface of the wheel assembly that correspond only to the spacing between subrollers 15 and 16, which is the same as the spacing between subrollers 16 and 17.

The general barrel shape of each roller has a largest diameter 28 that is central of the subroller 16, a smallest diameter 29 for each outermost axial circular end of the roller and intermediate diameters 30 between 28 and 29. Due to the angular offset between adjacent hubs of the wheel assembly shown in FIGS. 6 and 7 and the axial offset of the flanges 5, 6 with respect to the flange 1 that produces the axial offset of the bearing 13 with respect to the flange 1, it is seen from FIG. 6 that the rollers of one hub axially overlap the rollers of the adjacent hub. That is, the small diameters 29 are axially spaced from each other and the intermediate diameters are substantially coplanar with respect to the plane that is perpendicular to shaft 3 and symmetrical with respect to the wheel assembly of FIG. 6, whereas the angular offset large diameters 28 overlap such plane or intersect such plane.

From the above, it is seen that there is no stationary struture between rotatable portions of adjacent rollers, which permits adjacent rollers to be in substantial contact, which means a spacing from each other of their closest portions (at diameters 29 or at reinforcing members 18) that varies between actual contact and substantial space, but preferably is a spacing somewhat equal to the sum of the axial displacement of the rollers within their bearing supports for two adjacent rollers. As a result, it can be seen that the roller arms actually overlap as mentioned above with respect to FIG. 7 for adjacent wheels of the wheel assembly.

Figure 1:
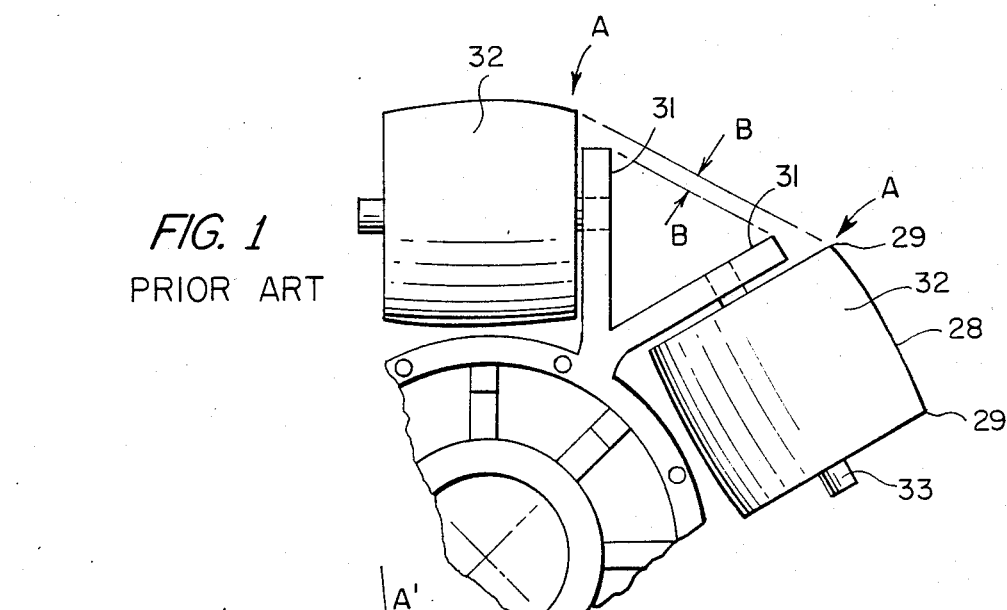
FIG. 1 is a partial end view of a portion of the present invention relating to an analysis of a multi directional wheel constructed without some features of the present embodiment.
Figure 8:
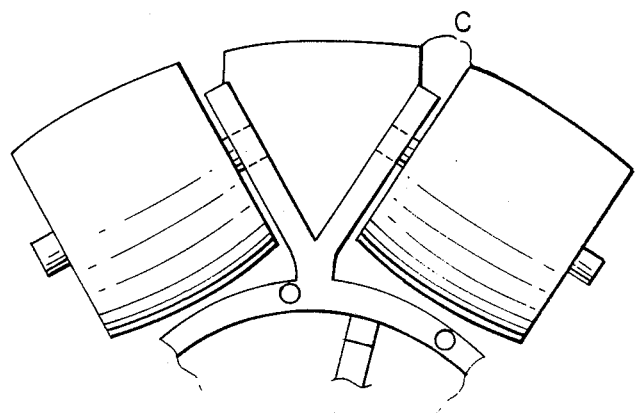
FIG. 8 is a view similar to FIG. 1 and showing the addition of a second wheel mounted in a fashion similar to that of FIG. 6.

To show the importance of this, as a part of the present invention, a hypothetical structure will be analyzed with respect to FIGS. 1 and 8. In FIG. 1, a hub is shown with bearing supports 31. A plurality of rollers 32 are around the periphery of the hub. Each roller has an external barrel shape identical to the generalized barrel shape of the rollers 14, that is, the diameters 28 and 29 are identical between roller 32 and 14 and the axial distance between the two diameters 29 of one roller is identical for both the rollers 32 and the rollers 14. Rollers 32 are provided with stub shafts 33 that are of the same diameter as the shafts 12 of rollers 14. These stub shafts 33 are held within similar diameter bearing holes of bearing supports 31 so that the circle of diameter 28 for roller 32 is exactly the same radial distance from the center of its hub as the circle of diameter 28 for roller 14 is from the center of its hub. Also, the outward extent of the bearing support 31 beyond the shaft 33 is exactly equal to the outward extent of the bearing support 9 beyond the shaft 12. The bearing supports 31 are of the same width, as measured parallel to an adjacent shaft 33, as the width of bearing supports 9 similar measured. As in the prior art, the bearing supports 31 are between the rollers. As measured along a line between the closest extent of diameters 29 for adjacent rollers, the bearing support 31 is equal in width to two of the bearing supports 9 to make the bearing supports for FIG. 1 of substantially the same strength as the bearing supports for FIG. 2.

With the structure of FIG. 1, it is seen that the distance between points A for adjacent rollers in FIG. 1 is substantially greater than the distance between points A' for adjacent rollers in FIG. 2, which greatly reduces a "flat spot" between adjacent rollers for a single wheel. A flat structure being supported by a wheel constructed according to FIG. 1 would extend linearly between points A and therefore have a small spacing from the adjacent bearing structure 31 equal to the distance between points B in FIG. 1. Thus, in the FIG. 1 structure, the object being supported by the wheel could drag on the bearing support 31 through deformation, wear, or manufacturing tolerances. In contrast the corresponding distance between points B' as seen in FIG. 2 with respect to the present invention is substantially greater than the distance between points B of FIG. 1.

With two of the wheels of FIG. 1 assembled in accordance with the teachings mentioned above with respect to FIGS. 2 and 6, the illustration of FIG. 8 is obtained and it is seen that there is no overlapping of rollers between adjacent wheels and in fact there is a considerable peripheral spacing between adjacent points C in FIG. 8. This spacing between points C is substantially greater than the spacing between adjacent diameters 30 with respect to the roller 14 as shown in FIG. 7 and would produce a substantial flat spot even for the wheel assembly of FIG. 8, which is substantially greater than any flat spot that would be produced by the wheel assembly of FIG. 7.

The principal concepts of the present invention are:

The journal or bearing supports with rollers are within the length of each roller;

The support structure for the roller is buried within the roller;

The roller is constructed integrally of one piece molded synthetic resin as a roller shaft combination, eliminating the separate axles of the prior art; and the rollers snap into journals with an interference fit from a side opening, which is particularly advantageous with respect to the wheel assembly that would prevent disassembly of the rollers from their bearing supports.

The method of assembly and the integral axle designs reduces the number of parts in a single wheel constructed according to the present invention having eight rollers and one body or nine parts, as compared to the prior art mentioned above wherein there would be eight rollers, eight axles and two body parts to produce eighteen parts. Therefore, reduction in parts is exactly one half. The present invention permits increasing the roller diameter for better transverse movement. In this regard, please note that FIGS. 1 and 8 are fictitious structures provided only for the purpose of illustration. Obviously, eight rollers constructed according to FIG. 8 could not be placed around the periphery of a single hub, due to the increase spacing between rollers, so that the rollers would of necessity be made smaller in axial dimension and would be made smaller in diameter to provide for less cantilevering or radial extent of the bearing supports.

In the prior art structures, considerable manual assembly is required, whereas with the present invention, assembly may be entirely automated. The prior art structure, as illustrated in FIG. 1, can easily provide for a base load engaging the bearing support or what is known as "hang-up" to impede easy movement of the load. With the spacing as noted with respect to the present invention, such hang-up is avoided. The present invention reduces the gap between roller support surfaces around the periphery concentric with the hub axis, greatly increases the clearance between the load and bearing supports to reduce hang-up or eliminate it and permits automated assembly.

The present embodiment is particularly well suited to construct very small conveying wheels, wherein the radius of the outermost portion of diameter 28 is 0.750 inches from hub axis 21, so that the overall diameter of the wheel is approximately 1.5 inches. Thus, the diameter of the wheel is preferably less than 2 inches. The spacing between adjacent subrollers of a single roller is preferably 0.045 inches, subrollers 15 and 17 have an axial dimension of 0.052 inches and subroller 16 preferably has an axial dimension of 0.116 inches, to provide an overall axial extent of the barrel shape of the roller as 0.310 inches. The scale of the drawings is approximately 4 times actual size. Most preferably 8 rollers are provided about the periphery of the wheel, with the angular spacing between rollers being approximately 45 degrees, and the angular offset between two assembled wheels being one half of 45 degrees. The angle defined by the cam surfaces for the keyhole shaped snap fit is approximately 60 degrees. While these are the specific dimensions of a preferred embodiment, they may be varied according to the broader aspects of the present invention.

While a preferred embodiment has been set forth with respect to the present invention for purposes of illustration and to show the advantages of the details, further embodiments variations and modifications are contemplated according to the broader aspects of the present invention, all as defined by the spirit and scope of the following claims.

I claim:

1. A cross directional wheel, comprising:
   a hub, having an outer periphery;
   first bearing means for mounting said hub for rotation in a main plane about a hub axis of rotation;
   a plurality of rollers, each of said rollers having a roller axis of rotation and an outer annular periphery concentric with said roller axis of rotation, wherein each of said rollers includes at least three coaxial subrollers axially spaced from each other and at least two coaxial shafts integrally joining adjacent pairs of subrollers;
   second bearing means mounting said plurality of rollers in substantially equally spaced relationship around the outer periphery of said hub so that each of said roller axes is parallel to a tangent of the hub periphery and perpendicular to the hub axis; and
   each of said rollers consisting of only a single one piece molded plastic part, said hub consisting of only a single one piece molded plastic part, and said first bearing means and said second bearing means consisting of only integral parts of said hub.

2. The wheel according to claim 1, wherein said hub includes, for each roller, at least two outwardly extending bearing supports extending between adjacent subrollers, respectively, each bearing support having a bore for receiving therein said shafts respectively to constitute said second bearing means.

3. The wheel according to claim 2, wherein each of said roller' annular periphery is generally a surface of revolution of an arc rotated about said roller axis, and said arc, as seen in an end view axially of said hub, is coincident with a reference circle passing through said arc of each of said rollers and coaxial with said hub axis.

4. The wheel according to claim 3, wherein each of said rollers has an intermediate diameter closest to said hub and has outer circular ends closely spaced from the adjacent roller outer circular end, respectively, with no structure therebetween.

5. The wheel according to claim 4, wherein each of said rollers has reinforcing portions extending axially outwardly from each roller outer circular end as a continuation of said shafts to be closely spaced to the reinforcing portion of the peripherally adjacent roller with no structure therebetween.

6. The device according to claim 5, wherein each of said bearing supports has an aperture leading to said bore that is formed by spaced apart opposed cam walls starting from a spacing that is greater than the diameter of said shafts and extending toward each other and toward said bore to a spacing that is less than the diameter of said shafts located substantially at the circumference of said bore, to provide a snap assembly of said roller shafts in said bearing support bores.

7. The wheel according to claim 6, wherein said aperture has a line of symmetry extending radially from the roller axis and extending generally parallel to the hub axis.

8. A roller assembly, consisting of two of the wheels of claim 7, wherein said wheels are assembled as coaxial mirror images of each other with said hubs being rigidly bonded together so that said bearing support apertures open inwardly of the assembly; said rollers of one hub being angularly, with respect to said hub axis, offset from said rollers of the other hub by an amount equal to one half the angle, with respect to said hub axis, between two adjacent rollers of one wheel.

9. The wheel according to claim 8, wherein said hub has a cylindrical portion with said bearing supports extending radially outward and with a plurality of radially inwardly extending teeth, said first bearing means comprising an inner cylindrical surface acting as a central bearing sleeve coaxial with an radially spaced from said cylindrical portion.

10. The wheel according to claim 9, wherein said hub has an inner flange connecting said bearing sleeve and said cylindrical portion, and said sleeve, said teeth and said cylindrical portion provide an internal gear as means for driving said hub about said hub axis.

11. The wheel according to claim 1, wherein each of said rollers has a midpoint on its periphery closely spaced from said hub and having roller outer circular ends closely spaced from the adjacent roller outer circular end, respectively, with no structure therebetween.

12. The wheel according to claim 11, wherein each of said rollers has reinforcing portions extending axially outwardly from each roller outer circular end as a continuation of said shafts to be closely spaced to the reinforcing portion of the peripherally adjacent roller with no structure therebetween.

13. The wheel according to claim 2, wherein each of said rollers has a midpoint on its periphery closely spaced from said hub and having roller outer circular ends closely spaced from the adjacent roller outer circular end, respectively, with no structure therebetween.

14. The wheel according to claim 13, wherein each of said rollers has reinforcing portions extending axially outwardly from each roller as a continuation of said shafts to be closely spaced to the reinforcing portion of the peripherally adjacent roller with no structure therebetween.

15. The wheel according to claim 1, wherein two of said wheels are assembled as coaxial mirror images of each other with said hubs being rigidly bonded together so that apertures of said second bearing means support said rollers and open inwardly of the assembly; said rollers of one hub being angularly, with respect to said hub axis, offset from said rollers of the other hub by an amount equal to one half the angle, with respect to said hub axis, between two adjacent rollers of one wheel.

16. The wheel according to claim 2, wherein two of said wheels are assembled as coaxial mirror images of each other with said hubs being rigidly bonded together so that apertures of said second bearing means support said rollers and open inwardly of the assembly; said rollers of one hub being angularly, with respect to said hub axis, offset from said rollers of the other hub by an amount equal to one half the angle, with respect to said hub axis, between two adjacent rollers of one wheel.

17. The device according to claim 2, wherein said hub has a cylindrical portion with said bearing supports extending radially outward and with a plurality of radially inwardly extending teeth, said first bearing means comprising an inner cylindrical surface acting as a central bearing sleeve coaxial with and radially spaced from said cylindrical portion.

18. The device according to claim 17, wherein said hub has an inner flange connecting said bearing sleeve and said cylindrical portion, and said sleeve, said teeth and said cylindrical portion provide an internal gear as means for driving said hub about said hub axis.

19. A conveyor comprising a plurality of the wheels of claim 1, including at least one conveyor rail, each of said wheels having a mounting shaft for mounting said wheels in a conveying line along said rail with a hub axis of each of said wheels being perpendicular to said rail.

20. A cross directional wheel, comprising:
a hub, having an outer periphery;
bearing means for mounting said hub for rotation in a main plane about a hub axis of rotation;
a plurality of rollers, each of said rollers having a roller axis of rotation and an outer annular periphery concentric with said roller axis of rotation;
second bearing means mounting said plurality of rollers in substantially equally spaced relationship around the outer periphery of said hub so that each of said roller axes is parallel to a tangent of the hub periphery and perpendicular to the hub axis; and
each of said rollers includes three integrally joined coaxial subrollers axially spaced from each other, two coaxial shafts integrally joining adjacent pairs of subrollers; and said hub including, for each roller, two outwardly extending bearing supports extending between adjacent subrollers, respectively, and having aligned bores receiving therein in snap fit engagement said shafts respectively to constitute said second bearing means.

21. A cross directional wheel according to claim 20, wherein each of said rollers has a midpoint in its periphery closely spaced from said hub and having roller outer circular ends closely spaced from the adjacent roller outer circular end, respectively, with no structure therebetween.

22. A cross directional wheel according to claim 21, wherein each of said rollers has reinforcing portions extending axially outwardly from each roller as a continuation of said shafts to be closely spaced to the reinforcing portion of the peripherally adjacent roller with no structure therebetween.

23. A cross directional wheel according to claim 22, wherein each of said roller's annular periphery is generally a surface of revolution of an arc rotated about said roller axis, and said arc, as seen in an end view axially of said hub, is coincident with a reference circle passing through said arc of each of said rollers and concentric with said hub axis.

24. An assembly of two cross-directional wheels, wherein:
each of said wheels has a hub having an outer periphery,
first bearing means for mounting said hub for rotation in a main plane about a hub axis of rotation,
a plurality of rollers, each of said rollers having a roller axis of rotation and an outer annular periphery concentric with said roller axis of rotation, and
second bearing means having bearing support apertures mounting said plurality of rollers in substantially equally spaced relationship around the periphery of said hub so that each of said roller axes is parallel to a tangent to the hub periphery and perpendicular to the hub axis; and, wherein,
said wheels are assembled as coaxial mirror images of each other with said hubs being rigidly bonded together so that said bearing support apertures open inwardly of the assembly; said rollers of one hub being angularly, with respect to said hub axis, offset from said rollers of the other hub by an amount equal to one half the angle, with respect to said hub axis, between two adjacent rollers of one wheel.

25. An assembly of two cross-directional wheels according claim 24, wherein each of said rollers includes three coaxial subrollers axially spaced from each other and two coaxial shafts integrally joining adjacent pairs of subrollers; and said hub including, for each roller, two outwardly extending bearing supports extending between adjacent subrollers, respectively, and having aligned bores receiving therein said shafts respectively to constitute said second bearing means.

26. The assembly according to claim 25, wherein each of said bearing support apertures leads to a respective one of said bores and is formed by spaced apart cam walls starting from the spacing that is greater than the diameter of said shafts and extending toward each other and toward said bore to a spacing that is less than the diameter of said shafts substantially at the diameter of said bore, to provide a snap assembly of said roller shafts in said bearing support bores.

27. The assembly according to claim 26, wherein each of said apertures has a line of symmetry extending radially from the roller axis of and extending generally parallel to the hub axis.

28. A conveyor comprising a plurality of the wheels of claim 24, including at least one conveyor rail, each of said wheels having a mounting shaft for mounting said wheels in a conveying line along said rail with a hub axis of each of said wheels being perpendicular to said rail.

29. The wheel of claim 27, wherein said teeth extend axially outward beyond the remainder of said hub with an axial surface at a radius from said hub axis that corresponds to the adjacent radius of one of said annular flanges so that two identical wheels may be coaxially assembled in mirror image and angularly offset from each other so that said teeth will telescope with and engage with said one of said annular flanges to hold said two wheels in coaxial assembly.

30. A cross-directional wheel, comprising:
a hub, having an outer periphery;
first bearing means for mounting said hub for rotation in a main plane about a hub axis of rotation;
a plurality of barrel shaped rollers, each having a roller axis of rotation and an outer annular periphery concentric with said roller axis of rotation;
second bearing means mounting said plurality of rollers in substantially equally spaced relationship about the periphery of said hub so that each of said roller axes is parallel to a tangent to the hub periphery and perpendicular to the hub axis; and at one axial end of said wheel, the outermost diameter of said barrel shaped roller extending axially outwardly beyond the outermost axial portion of said hub, and the smallest diameter of said barrel shaped roller being axially spaced inside of the outermost axial portion of said hub on said one axial end.

31. A wheel assembly, comprising two of the wheels of claim 30, wherein said wheels are assembled as coaxial mirror images of each other with each of said one axle ends of said hubs being rigidly bonded together with the rollers of one hub being angularly, with respect to the axis of said hub, offset from the rollers of the other hub by an amount equal to one half the angle, with respect to said hub axis, between two adjacent rollers of one wheel, so that the large diameter portion of each of said rollers extends beyond a central plane of symmetry that is perpendicular to the hub axis to a position axially between the adjacent rollers of the other wheel.

32. The assembly of claim 31, further including bearing supports for supporting said second bearing means extending outwardly from each hub; each of said rollers having two shaft portions; each of said bearing supports having a bearing bore carrying therein a corresponding one of said shafts; each of said bearing supports having an aperture that is formed by spaced apart cam walls starting from a spacing that is greater than the diameter of said shafts, and extending towards each other and toward said bore to a spacing that is less than the diameter of said shafts to provide a snap assembly with said roller shafts in said bearing support bores; said apertures each having a line of symmetry extending radially from the roller axis and extending generally parallel to the hub axis; and said bearing support apertures of each wheel opening inwardly toward the other wheel of the assembly so that said rollers cannot be removed from said bearing support apertures after assembly of said wheels by bonding said hubs together.

33. A cross-directional wheel assembly, comprising:
two wheels, each having a hub, having an outer periphery,
bearing means for mounting said hub for rotation in a main plane about a hub axis of rotation,
a plurality of barrel shaped rollers, each having a roller axis of rotation and an outer annular periphery concentric with said roller axis of rotation,
second bearing means comprising bearing supports extending outwardly from each hub mounting said plurality of rollers in substantially equally spaced relationship about the periphery of said hub so that each of said roller axes is parallel to a tangent to the hub periphery and perpendicular to the hub axis;
each of said rollers having two shafts,
each of said bearing supports having a bearing bore carrying therein a corresponding one of said shafts,
each of said bearing supports having an aperture that is formed by spaced apart cam walls starting from a spacing that is greater than the diameter of said shafts and extending towards each other and toward said bore to a spacing that is less than the diameter of said shafts, to provide a snap assembly with said roller shafts in said bearing support bores, said apertures each having a line of symmetry extending radially from the roller axis and extending generally parallel to the hub axis; wherein said wheels are assembled as coaxial mirror images of each other with said one ends of said hubs being rigidly bonded together with the rollers of one hub being angularly, with respect to the axis of said hub, offset from the rollers of the other hub by an amount equal to one half the angle, with respect to said hub axis, between two adjacent rollers of one wheel, and wherein said bearing support apertures of each wheel opening inwardly toward the other wheel of the assembly so that said rollers cannot be removed from said bearing support apertures after assembly of said wheels by bonding said hubs together.

34. A cross directional wheel, comprising:
a hub, having an outer periphery;
bearing means surrounding said hub for rotation in a main plane about a hub axis of rotation;
a plurality of integrally molded, one piece rollers, each of said rollers having a roller axis of rotation and an outer annular periphery concentric with said roller axis of rotation, said rollers comprising three subrollers integrally joined;
second bearing means mounting said plurality of rollers in substantially equally spaced relationship around the outer periphery of said hub so that each of said roller axes is parallel to a tangent to the hub periphery and perpendicular to the hub axis;
said hub having a single integrally molded one piece part comprising two radially spaced apart annular flanges, a connecting flange radially extending between said annular flanges, and a plurality of teeth individually spaced equally around said hub and extending between at least one of said annular flanges and said connecting flange for reinforcement and for providing gear means for driving said wheel.

* * * * *